United States Patent [19]

Belart et al.

[11] Patent Number: 4,923,256
[45] Date of Patent: May 8, 1990

[54] HYDRAULIC BOOSTER

[75] Inventors: Juan Belart, Moerfelden-Walldorf; Hans-Christof Klein, Hattersheim, both of Fed. Rep. of Germany

[73] Assignee: Alfred Teves GmbH, Frankfurt Am Main, Fed. Rep. of Germany

[21] Appl. No.: 258,234

[22] Filed: Oct. 14, 1988

[30] Foreign Application Priority Data

Oct. 17, 1987 [DE] Fed. Rep. of Germany ....... 3735237
Feb. 17, 1988 [DE] Fed. Rep. of Germany ....... 3804851

[51] Int. Cl.$^5$ .......................... B60T 8/44; F15B 7/08
[52] U.S. Cl. .................................. 303/114; 188/358; 188/356; 303/50; 303/119
[58] Field of Search .................... 303/50–56, 303/114, 119, 116, 113, 100, DIG. 3, DIG. 4; 188/355, 358, 359, 356, 357, 273; 60/547.1, 552, 566, 591, 582, 563, 548

[56] References Cited

U.S. PATENT DOCUMENTS

| 3,251,187 | 5/1966 | Mossback . | |
|---|---|---|---|
| 3,449,019 | 6/1969 | Walker | 303/114 |
| 3,503,655 | 3/1970 | Heimler | 303/114 |
| 3,578,820 | 5/1971 | Riordan | 303/114 |
| 3,608,982 | 9/1971 | Inada et al. | 303/114 |
| 3,729,235 | 4/1973 | Bach et al. | 303/114 |
| 3,738,712 | 6/1973 | Flory | 303/114 |
| 3,827,763 | 8/1974 | Kobashi et al. | 303/114 |
| 4,582,365 | 4/1986 | Belart | 303/114 |
| 4,598,955 | 7/1986 | Belart et al. | 303/114 |
| 4,702,531 | 10/1987 | Kircher et al. | 303/114 |
| 4,708,401 | 11/1987 | Klein | 303/114 |
| 4,750,790 | 6/1988 | Klein | 303/114 |
| 4,778,225 | 10/1988 | Rudolph et al. | 303/114 |
| 4,787,685 | 11/1988 | Klein | 303/114 |
| 4,815,793 | 3/1989 | Reinartz et al. | 303/119 X |
| 4,828,336 | 5/1989 | Steffer | 303/119 X |

FOREIGN PATENT DOCUMENTS

| 1426560 | 3/1969 | Fed. Rep. of Germany . |
| 2609905 | 9/1977 | Fed. Rep. of Germany . |
| 3042859 | 5/1981 | Fed. Rep. of Germany . |
| 3319465 | 11/1984 | Fed. Rep. of Germany . |
| 3320822 | 12/1984 | Fed. Rep. of Germany . |
| 3338250 | 5/1985 | Fed. Rep. of Germany . |
| 3422154 | 3/1986 | Fed. Rep. of Germany . |
| 3437834 | 4/1986 | Fed. Rep. of Germany . |
| 3440972 | 5/1986 | Fed. Rep. of Germany . |
| 3444828 | 6/1986 | Fed. Rep. of Germany . |
| 3446824 | 6/1986 | Fed. Rep. of Germany . |
| 3538317 | 7/1986 | Fed. Rep. of Germany . |
| 3600729 | 7/1986 | Fed. Rep. of Germany . |
| 2526881 | 11/1983 | France . |
| 2049850 | 12/1980 | United Kingdom . |

Primary Examiner—Douglas C. Butler
Attorney, Agent, or Firm—Robert P. Seitter

[57] ABSTRACT

A resettable booster is disclosed including a booster chamber in communication with a resetting chamber through a closable connection. For pressure relief of the master brake cylinder, valves are switched so that the booster piston is pressure-balanced and the master brake cylinder force shifts the booster piston back into the brake release position. The pressure fluid is supplied from the booster chamber into the resetting chamber. Advantageously, the volume intake of the booster is small, hence allowing the use of an extremely simple pressure source construction. The pressure source is a cylinder with an accumulator chamber that is confined by a piston, wherein the piston is moved by the difference in pressure between the atmosphere and the vacuum in the intake side internal-combustion engine of the vehicle.

12 Claims, 2 Drawing Sheets

HYDRAULIC BOOSTER

BACKGROUND OF THE INVENTION

1. Field of the Invention

This invention relates to a hydrulic booster and, in particular to a booster for an anti-lock vehicular brake system of the type having a booster piston with one end surface confining a booster chamber and another end surface confining a resetting chamber and also, having a pedal-force-actuated braking-pressure control valve for delivering pressure into the booster chamber which is proportional to the pedal force.

2. Description of the Relevant Art

A booster of this type is described in the German publication DE-OS 34 44 828. The booster is part of a hydraulic anti-lock brake system. The wheel brake cylinders are in communication with the master brake cylinder by way of closable brake lines. For the purpose of developing pressure in the wheel brakes, the master brake cylinder is assisted by the hydraulic booster, and the master brake cylinder pressure is supplied through the open brake lines to the wheel brake cylinders. Pressure modulation in a wheel about to lock during braking is achieved as follows: first the brake lines to the non-locking wheels are shut off, and subsequently the master brake cylinder is relieved from the actuating force. As a result, the pressure in the master brake cylinder and also in the wheel brake cylinder of the imminently locking wheel is decreased. To relieve force of the master brake cylinder, a counterforce is built up in the booster provided upstream thereof. The hydraulic booster includes a booster piston which confines the booster chamber with one end surface and bounds the resetting chamber with its other end surface. For actuation of the master brake cylinder, a pressure proportional to pedal force is built up in the booster chamber which acts upon the booster piston and displaces it in a direction for actuation of the master brake cylinder. In order to reset the booster piston (i.e., for relieving the master brake cylinder from force) the following connecting operation is performed. The resetting chamber, which is initially pressureless, is connected to the pressure side and the booster chamber is connected to the suction side of the pump. The resetting chamber fills with pressure fluid and the booster chamber is evacuated. For renewed pressure build-up, the switching valves are reset so that the booster chamber is again filled with pressure fluid and the resetting chamber is evacuated.

Since braking pressure modulation comprises several control cycles and the booster piston is moved back and forth considerable quantities of pressure fluid are required which must be made available by the pressure source. This is possible only in the event that the pressure source—by means of a pump—is always replenished with the pressure fluid that is discharged in each case. Therefore, the pump must have a large feed capacity and, accordingly, has a correspondingly great energy requirement.

SUMMARY OF THE INVENTION

An object to be achieved by the present invention is to modify known hydraulic boosters so that fluid requirement is reduced and that the energy input to the pressure source be decreased.

This object is achieved according to the invention wherein there is provided a closable pressure-fluid connection between the booster chamber and the resetting chamber, and the resetting chamber communicates with the supply reservoir by way of a closable connection.

For pressurization of the master brake cylinder, the connection between the booster chamber and resetting chamber is interrupted, and the resetting chamber connects to the supply reservoir. For pressure relief of the master brake cylinder, the booster is reset by interrupting the resetting chamber's connection to the supply reservoir and by establishing its connection to the booster chamber.

A booster of a very short overall length is achieved according to the invention in that the resetting chamber is confined by a wall on the side opposite to the booster piston, through which wall a tappet secured to the booster piston is guided in a sealing manner. This tappet can be moved into abutment with the master brake cylinder.

Advantageously, the construction can be made particularly compact wherein the braking pressure control valve is accommodated in the booster piston, the pressure fluid supply being carried out by way of an annular chamber at the booster piston, and pressure fluid discharge being through a channel extending through the tappet into a pressureless chamber between the booster and master brake cylinder. This chamber is in permanent communication with the supply reservoir.

For pressure relief of the master brake cylinder, the valves disposed in the line between the booster chamber and the resetting chamber, as well as in the connection between the resetting chamber and the supply reservoir, can be changed over, whereby the booster piston is pressure-relieved, in relation to the pressures prevailing in the resetting chamber and reservoir. The additional force of the master brake cylinder acting on the tappet urges the booster piston back into its brake release position, with pressure fluid propagating from the booster chamber into the resetting chamber. Unlike present boosters, this pressure fluid is not required to be supplied by the pressure source. Only in the event of renewed pressure build-up will the pressure fluid be discharged from the resetting chamber and will pressure fluid from the pressure source be introduced into the booster chamber. That is to say, while the present state of the art requires pressure fluid to be supplied by the pressure source both upon pressurization and pressure-relief of the master brake cylinder, this is necessary only during pressurization according to the invention.

The construction according to the invention provides a novel pressure source. The pressure source is composed of a cylinder in which an accumulator chamber is provided that is confined by a piston. The piston is in connection with a movable wall in a vacuum reservoir, with the side of the movable wall remote from the piston being acted on by the atmospheric pressure, and with the side close to the piston being exposed either to a pressure below atmospheric pressure or to atmospheric pressure.

To fill the accumulator, the chambers in front of and behind the movable wall are pressure-balanced so that a resetting spring is able to move the piston to the end for achieving a maximum volume of the accumulator chamber. In this arrangement, pressure fluid is supplied from the supply reservoir through a non-return valve into the accumulator chamber. For pressurization, the one chamber is connected to a vacuum source, and the pressure fluid in the accumulator chamber is pressurized. By way of another non-return valve, this pressure fluid can be delivered to the booster. The volume of the accumulator chamber is dimensioned such that it is sufficient even if several control cycles are performed during one slip-controlled braking operation. Therefore, the accumulator only needs to be refilled after each respective braking operation. If, under extreme conditions, the fluid volume is exhausted during a slip control operation, this condition can be detected by a correspondingly arranged switch, and a charging process will be initiated.

According to an important embodiment of this invention, the available vacuum of an internal-combustion engine in the vehicle can be used and no separate pump unit need be used.

Since, as has been explained above, the fluid requirement of the booster is not as large as that of known systems, an accumulator with a smaller fluid volume can be used.

BRIEF DESCRIPTION OF THE DRAWING

The invention will be better understood from the following Detailed Description of a Preferred Embodiment and the Drawing in which.

DETAILED DESCRIPTION OF A PREFERRED EMBODIMENT

Figure 1:
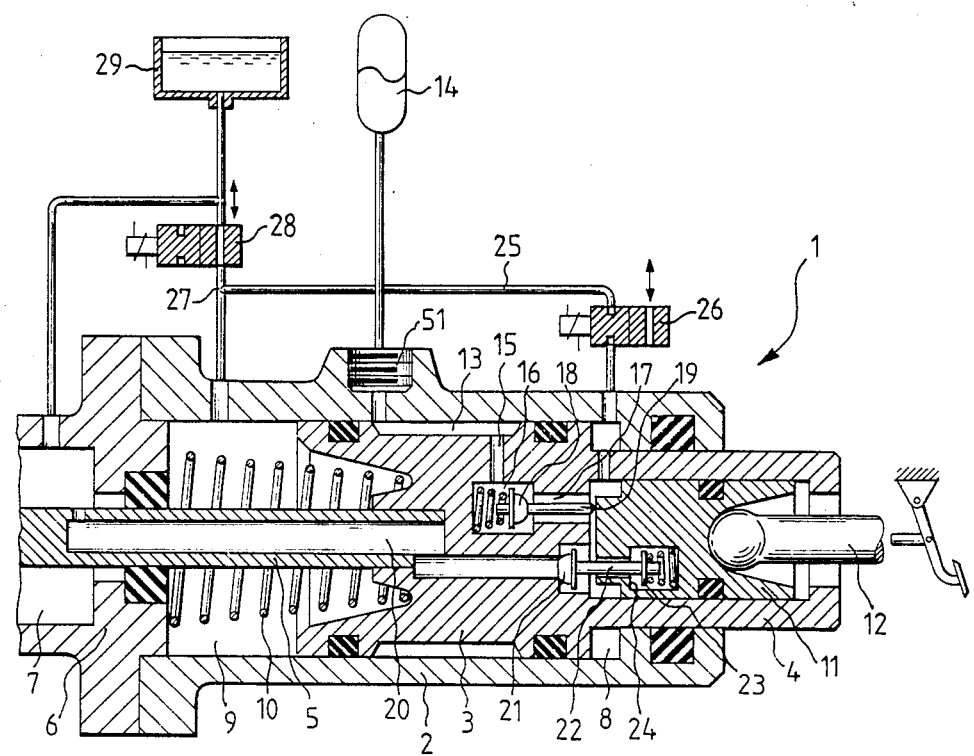
FIG. 1 is a schematic and cross-sectional view of a hydraulic brake power booster and system according to the invention.

First, FIG. 1 will be referred to.

The hydraulic brake power booster 1 is composed of a cylinder-shaped housing 2 in which a booster piston 3 is guided. On the pedal side of the piston, the booster piston 3 extends into a sleeve 4 which extends out of the booster housing 2.

On its other side, the booster piston 3 includes a tappet 5 which extends sealingly through a wall 6.

Figure 2:
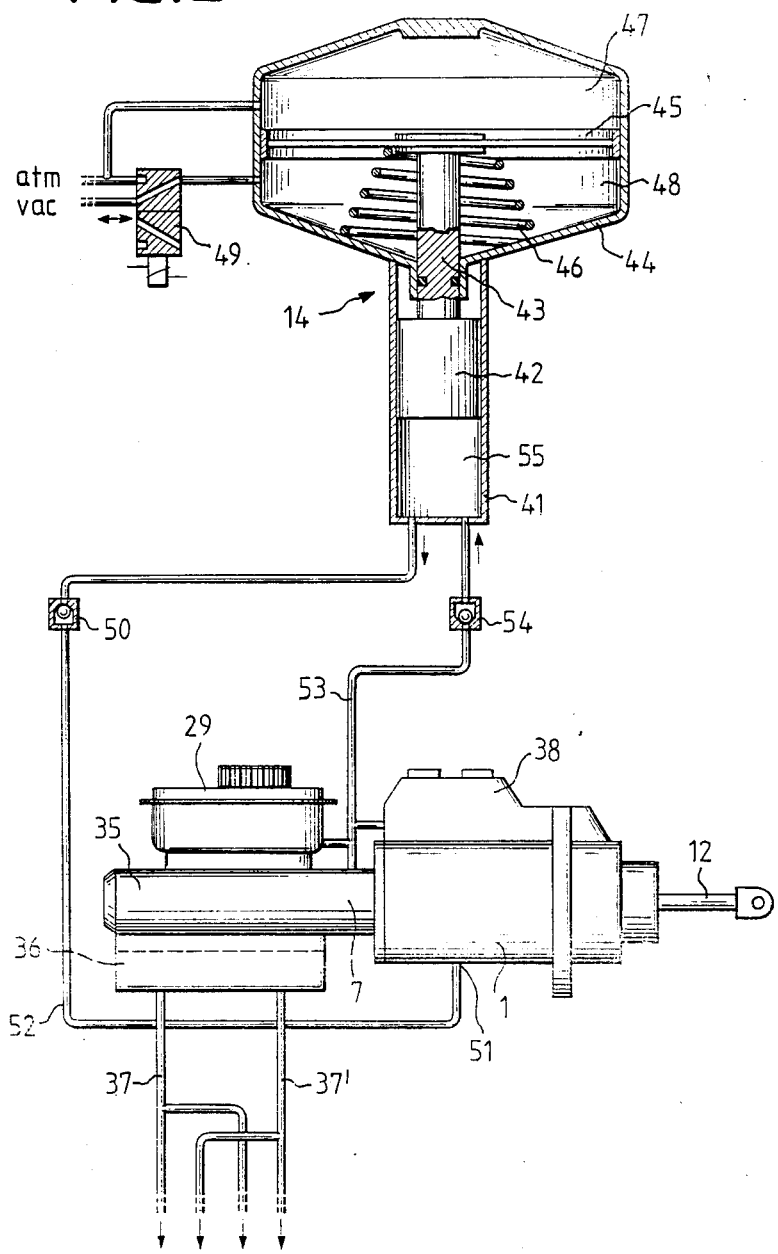
FIG. 2 is a partial cross sectional and schematic view of a pressure source, brake power booster and the master brake cylinder according to the invention.

A master brake cylinder 35 extends from the booster as shown in FIG. 2, and includes a pressureless chamber 7 between the master brake cylinder 35 and the booster 1. The tappet 5 is coupled with the primary piston, not shown, of the master brake cylinder.

A booster chamber 8 is disposed on the pedal side of the booster piston 3, and a resetting chamber 9 is disposed between the booster piston 3 and the wall 6 on the side of the piston remote from the pedal. Incorporated in this resetting chamber 9 is a resetting spring 10 which moves the booster piston to assume its brake release position as shown in FIG. 1.

Sealingly guided in the sleeve 4 is an actuating piston 11 which, by way of a push rod 12, is in connection with the schematically illustrated brake pedal.

At its outer rim, the booster piston 3 is provided with an annular chamber 13 which is in communication with a pressure source 14 through a housing port 51.

A radial bore 15 connects the annular chamber 13 to a valve chamber 16, and a longitudinal bore 17 connects the valve chamber 16 to the resetting chamber 8.

Arranged in the valve chamber 16 is a valve closure member 18 of the inlet valve which member is urged by a spring against the opening of the longitudinal bore 17 and lifts from the sealing seat by means of a tappet 19 which is movable into abutment with the actuating piston 11.

Furthermore, a pressure-fluid connection is provided in the form of a channel 20 through the booster piston 3 and the tappet 5 between the booster chamber 8 and the unpressurized chamber 7. This connection is controlled by a valve whose closure member 21 is movable to sealingly bear against the port of the pressure fluid channel 20. The closure member 21 includes a pin 22 which includes a collar 23 which is movable into abutment with a projection 24 on the actuating piston.

Between the booster chamber 8 and the resetting chamber 9, there is a pressure-fluid connection 25 in which a two-way/two-position directional control valve 26 is inserted. A pressure-fluid connection 27 is provided between the resetting chamber 9 and the supply reservoir 29 and includes a two-way/two-position directional control valve 28.

In operation, for pressurization of the master brake cylinder, the two valves 26, 28 are in their illustrated positions, that is, valve 26 is closed and while valve 28 is open.

FIG. 1 shows the position of the actuating piston immediately after depression of the brake pedal. The actuating piston 11 is displaced in the direction of the booster piston 3 so that it abuts on the tappet 19, and the valve closure member 18 has lifted from its seat. The edge 24 has moved away from the collar 22 and the valve closure member 21 rests on the sealing seat as a result. In this position, pressure fluid flows from the pressure source 14 into the annular chamber 13 as well as into the channels 15 and 17 and into the booster chamber 8. Pressure accordingly, develops. On the one hand, this pressure acts upon the booster piston and moves it in the direction of the master brake cylinder, to the left in FIG. 1. On the other hand, the pressure acts upon the actuating piston 11 and develops a resetting force acting on the brake pedal, to the right in FIG. 1. When the booster piston 3 moves to the left, the tappet 19 moves away from the actuating piston 11, and the valve closure member 18 moves to bear against the sealing seat so that the pressure-fluid connection between pressure source and booster chamber 8 is interrupted. To increase the pressure, the pedal must be depressed further. When the brake is applied, the pressure fluid in the resetting chamber 9 is supplied in a force-free manner through the valve 28 into the supply reservoir 29.

As soon as brake slip control necessitates that the pressure in the master cylinder should be relieved, the booster piston must be reset. To achieve this, valve 28 will be closed and valve 26 opened. Because booster chamber 8 and resetting chamber 9 are in communication, the pressure will be the same in both chambers, and the piston will be force-balanced in respect of the pressure because the respective effective surface areas on the ends of the piston are of equal size. Accordingly, only the pressure of the pressure fluid enclosed in the master brake cylinder may act by way of the tappet 5 upon the booster piston 3. As a consequence whereof the booster piston 3 is displaced to the right into its release position. Pressure fluid flows from the booster chamber 8 into the resetting chamber 9. For renewed actuation of the master brake cylinder, the valves 26, 28 will be changed over, and the master brake cylinder can again develop a brake force as described.

FIG. 2 shows the braking pressure generator including the booster 1 and master brake cylinder 35, as well as a pressure source 14 which is substantially composed of a cylinder 41, a piston 42 and a vacuum housing 44.

Disposed at the master brake cylinder is the supply reservoir 9, as well as a valve block 36 which contains the pressure-modulating valves. Connected to the master brake cylinder 35 are the brake lines 37, 37' which lead to the wheel brakes.

The valves 26, 28 are provided in a valve block 38 which is flanged to the booster housing.

The pressure source is composed of a cylinder 41 and a piston 42 which confines in the cylinder 41 an accumulator chamber 55. This accumulator chamber 55 is in communication with the pressure port 51 (compare also FIG. 1) at the booster 1 through a pressure fluid line 52 in which a non-return valve 50 is inserted. The non-return valve 50 opens in the direction of the booster.

Furthermore, the accumulator chamber 55 is in communication through a pressure fluid line with the unpressurized chamber 7 and hence with the supply reservoir 29. Inserted into the line 53 is another a non-return valve 54 which closes toward the unpressurized chamber 7.

By way of an intermediate member 43, the piston 42 is coupled to a movable wall 45 of a vacuum casing 44. The chamber 48 close to the piston can be connected by means of a valve 9 alternatively to a vacuum source (vac) or to the atmosphere (atm). The chamber 47 is in permanent communication with the atmosphere. Furthermore, there is a resetting spring 46 which moves the movable wall and thus the piston 42 in the direction of a maximum volume of the accumulator chamber 55.

The valves 26, 28 as well as pressure-modulating valves in the valve block 36 and the valve 49 can be driven by a slip control apparatus.

To fill the accumulator chamber 55, the valve 49 is switched such that chamber 48 connects to the atmosphere so that the movable wall is pressure-balanced in respect of the pressures acting upon it. The resetting spring 46 moves the wall 45 in such a fashion that the volume of the accumulator chamber 55 is increased so that pressure fluid is sucked in out of the supply reservoir through the non-return valve 54. As soon as the maximum volume of the accumulator chamber 55 is attained, which can be determined under certain circumstances by a switch at the piston 42, chamber 48 will be connected to the vacuum source, as a result whereof the pressure difference at the movable wall 45 will pressurize the accumulator chamber 55.

During a braking operation, and in particular during a slip control action, pressure fluid is taken from the accumulator chamber 55 upon each pressure build-up in the master brake cylinder, the accumulator chamber thus emptying gradually. However, the volume of the accumulator is dimensioned such that it is sufficient to ensure pressure build-up several times.

Since the volume intake of the booster is reduced in contrast to the state of the art, the accumulator can have a relatively small chamber.

After a braking operation is terminated, the pressure fluid volume in the accumulator chamber 55 is largely exhausted so that the charging process referred to hereinabove will commence.

Should the pressure fluid in the accumulator chamber 55 be exhausted during a brake slip control action, which can be sensed by a switch at the piston 42, the charging process must be initiated during a brake slip control action, which influences of course the quality of the control, since no brake slip control action can take place during the filling period.

The construction according to the invention provides for utilizing exploiting the vacuum available in the suction system of the internal-combustion engine as a pressure source. Since the booster is constructed such that its volume intake is relatively small, the accumulator chamber 55 may also be reduced in size. Hence, the invention provides for an economical construction and also can eliminate the requirement for easily disturbed pressure sources of the type including an accumulator and motor-driven pump.

What is claimed is:

1. A hydraulic booster for an anti-lock vehicular brake system comprising, in combination: a booster piston having one end surface confining a booster chamber and another end surface confining a resetting chamber, a master brake cylinder adjacent to and cooperating with said booster piston, a pedal-force-actuated braking-pressure control valve means for delivering pressurized fluid from a pressure source of said brake system into the booster chamber in an amount proportional to a pedal-force, a pressure-fluid connection between the booster chamber and the resetting chamber including means for closing said pressure-fluid connection, said resetting chamber communicating with a supply reservoir through a connection including means for closing said connection, wherein for pressurization of said master cylinder said pressure-fluid connection between the booster chamber and the resetting chamber is closed and the connection between the resetting chamber and the supply reservoir is open, and wherein for pressure relief of said master cylinder, said pressure-fluid connection is open and the connection between the resetting chamber and the supply reservoir is closed.

2. The booster as claimed in claim 1, wherein when the pressure-fluid connection between the booster chamber and the resetting chamber is open, the connection between the resetting chamber and the supply reservoir is closed.

3. The booster as claimed in claim 1, wherein the resetting chamber is confined by a wall disposed opposite to the booster piston.

4. The booster as claimed in claim 3, wherein a tappet is provided at the booster piston, said tappet extends sealingly through the wall and is movable into abutment with a master brake cylinder.

5. The booster as claimed in claim 1, wherein said one end surface and said another end surface are of substantially equal area.

6. The booster as claimed in claim 1, wherein the braking pressure control valve means is accommodated in the booster piston.

7. The booster as claimed in claim 6, wherein the braking pressure control valve means includes an inlet valve and an outlet valve, the inlet valve connected to the pressure fluid source and the outlet valve connected to the supply reservoir.

8. The booster as claimd in claim 7, wherein the inlet and outlet valves are actuated by a pedal-actuated actuating piston.

9. The booster as claimed in claim 8, including a pressure fluid channel in the booster piston and a tappet on the booster piston, said pressure fluid channel extends from the outlet valve to an unpressurized chamber which is in communication with the supply reservoir.

10. A booster and pressure source for an antilock vehicular brake system, comprising, in combination: a booster piston having one end surface confining a booster chamber and another end surface confining a resetting chamber, a pedal-force-actuated-braking pressure control valves means for delivering a pressurized fluid from a pressure port into the booster chamber proportional to a pedal force, a pressure fluid connection between the booster chamber and the resetting chamber including means for closing said pressure fluid connection, said resetting chamber communicates with a supply reservoir of the brake system though a connection including means for closing said connection, and a pressure source including a piston in a housing confining an accumulator chamber coupled to a movable wall on said housing and confining an accumulator chamber means for exposing said movable wall to a difference in pressure between the atmosphere and a vacuum source, said accumulator chamber connected to said pressure port of said booster through a non-return valve and to said supply reservoir through another non-return valve.

11. The booster and pressure source as claimed in claim 10, wherein one side of said movable wall is exposable to an air-intake system of an internal-combustion engine.

12. The booster and pressure source as claimed in claim 10, wherein the accumulator chamber is connected through another non-return valve to an unpressurized chamber between a master brake cylinder of the brake system and the booster.

* * * * *